(12) United States Patent
Cox et al.

(10) Patent No.: US 9,650,129 B2
(45) Date of Patent: May 16, 2017

(54) CONTROL OF GROUND TRAVEL AND STEERING IN AN AIRCRAFT WITH POWERED MAIN GEAR DRIVE WHEELS

(71) Applicant: Borealis Technical Limited, North Plains, OR (US)

(72) Inventors: Rodney T. Cox, North Plains, OR (US); Isaiah W. Cox, London (GB)

(73) Assignee: Borealis Technical Limited, Gibraltar (GI)

( * ) Notice: Subject to any disclaimer, the term of this patent is extended or adjusted under 35 U.S.C. 154(b) by 143 days.

(21) Appl. No.: 14/654,510

(22) PCT Filed: Dec. 19, 2013

(86) PCT No.: PCT/IB2013/003264
§ 371 (c)(1),
(2) Date: Jun. 19, 2015

(87) PCT Pub. No.: WO2014/184608
PCT Pub. Date: Nov. 20, 2014

(65) Prior Publication Data
US 2015/0329202 A1  Nov. 19, 2015

Related U.S. Application Data

(60) Provisional application No. 61/739,715, filed on Dec. 19, 2012.

(51) Int. Cl.
*B64C 25/50* (2006.01)
*B64C 25/40* (2006.01)
*B64C 25/34* (2006.01)

(52) U.S. Cl.
CPC ............ *B64C 25/405* (2013.01); *B64C 25/50* (2013.01); *B64C 2025/345* (2013.01); *Y02T 50/823* (2013.01)

(58) Field of Classification Search
USPC .................................... 244/50, 103 R, 100 R
See application file for complete search history.

(56) References Cited

U.S. PATENT DOCUMENTS 3,516,625 A   6/1970   Houser et al.
3,807,664 A   4/1974   Kelly, Jr. et al.
(Continued)

FOREIGN PATENT DOCUMENTS

WO   2012106643 A1   8/2012

*Primary Examiner* — Christopher P Ellis

(57) ABSTRACT

A controllable aircraft taxi system is provided that enables the simultaneous control of aircraft autonomous ground movement and direction of aircraft autonomous ground movement. Independently controlled non-engine drive means capable of driving an aircraft landing gear wheel to move an aircraft autonomously on the ground without reliance on the aircraft's main engines are mounted to provide driving torque to aircraft a selected number of main landing gear wheels. The aircraft nose landing gear steering system is provided with steering angle detection and measurement means adapted to communicate with main landing gear wheel non-engine drive means, enabling simultaneous control over both autonomous aircraft ground travel and direction of autonomous aircraft ground travel. The present invention overcomes steering challenges presented by using non-engine drive means on main landing gear wheels to drive aircraft autonomously during taxi.

10 Claims, 2 Drawing Sheets

(56) References Cited

U.S. PATENT DOCUMENTS

| | | | |
|---|---|---|---|
| 5,242,131 A | 9/1993 | Watts | |
| 6,657,334 B1 | 12/2003 | Edelson | |
| 6,671,588 B2* | 12/2003 | Otake | B64C 25/48 244/175 |
| 6,838,791 B2 | 1/2005 | Edelson | |
| 7,116,019 B2 | 10/2006 | Edelson | |
| 7,445,178 B2* | 11/2008 | McCoskey | B64F 1/32 244/100 R |
| 7,469,858 B2 | 12/2008 | Edelson | |
| 8,517,303 B2* | 8/2013 | Dilmaghani | B64C 25/405 244/100 R |
| 8,620,493 B2* | 12/2013 | Hughes | G05D 1/0083 244/76 R |
| 9,074,891 B2* | 7/2015 | Nutaro | G01C 21/00 |
| 9,193,449 B2* | 11/2015 | Cox | B64C 25/405 |
| 2006/0273686 A1 | 12/2006 | Edelson et al. | |
| 2007/0282491 A1* | 12/2007 | Cox | B64C 25/40 701/3 |
| 2008/0147252 A1* | 6/2008 | Bayer | B64C 25/50 701/3 |
| 2008/0203217 A1* | 8/2008 | Frank | B64F 1/22 244/50 |
| 2009/0261197 A1* | 10/2009 | Cox | B64C 25/36 244/50 |
| 2009/0294577 A1* | 12/2009 | Roques | B64C 25/40 244/50 |
| 2012/0018574 A1 | 1/2012 | Bayer | |
| 2012/0104159 A1 | 5/2012 | Charles et al. | |
| 2015/0266565 A1* | 9/2015 | Cox | B64C 25/405 244/50 |

* cited by examiner

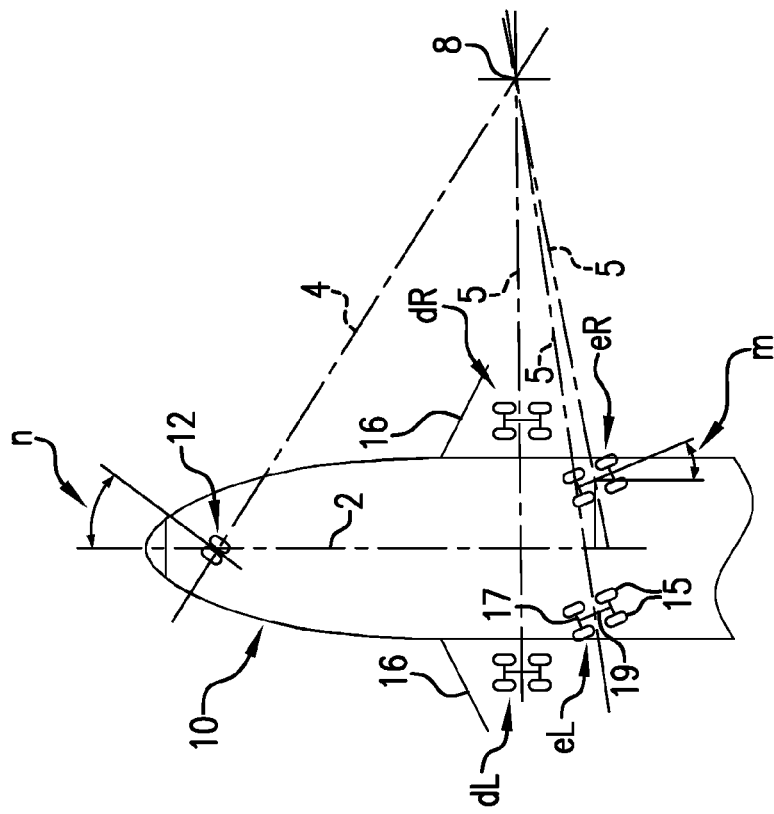
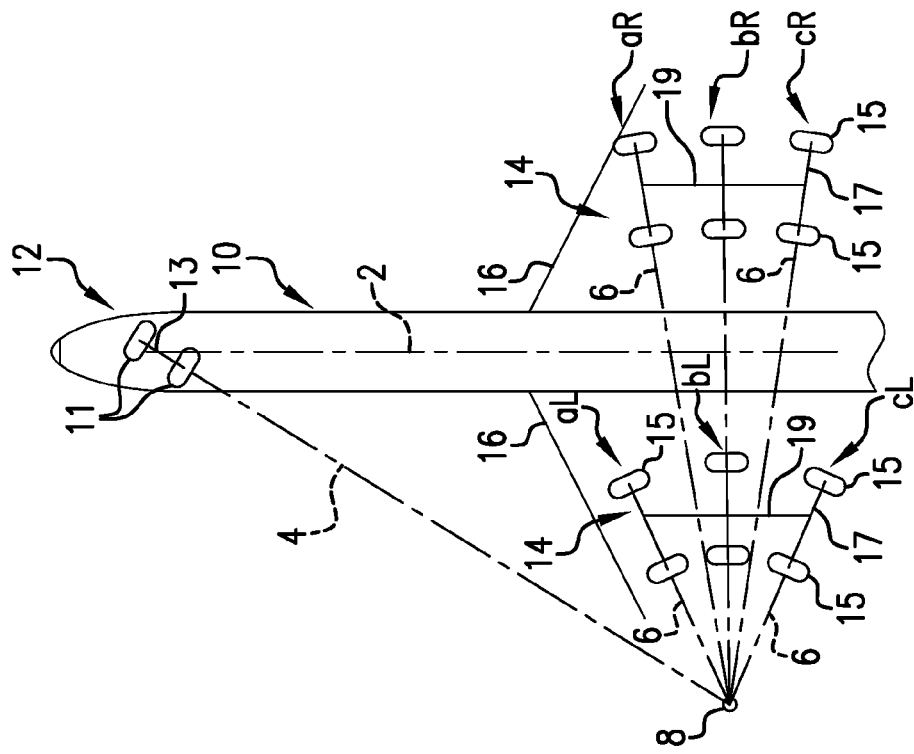

CONTROL OF GROUND TRAVEL AND STEERING IN AN AIRCRAFT WITH POWERED MAIN GEAR DRIVE WHEELS

PRIORITY CLAIM

This application claims priority from U.S. Provisional Patent Application No. 61/739,715, filed Dec. 19, 2012, the disclosure of which is fully incorporated herein.

TECHNICAL FIELD

The present invention relates generally to controlling movement of an aircraft on the ground during taxi and specifically to controlling ground travel and direction of ground travel in an aircraft equipped with one or more non-engine powered main landing gear drive wheels.

BACKGROUND OF THE INVENTION

Moving aircraft on the ground between landing and takeoff without using the aircraft's main engines or tow vehicles has been proposed, and approaches for achieving the benefits that accompany such autonomous aircraft ground travel are being investigated. Non-engine drive means mounted to drive one or more aircraft landing gear wheels have been proposed. Such non-engine drive means may be electric, hydraulic, or pneumatic, although most effort has focused on developing electric drive means systems capable of integration into an aircraft wheel to drive the wheel and, therefore, the aircraft during taxi. An aircraft's auxiliary power unit (APU) is the preferred source of electric power supplied to landing gear wheel drive means for what are being referred to as electric taxi systems. The significant fuel and other savings found to accompany the autonomous aircraft ground movement possible when aircraft can move efficiently during ground travel without reliance on the main engines make electric taxi systems very attractive.

Electric and other drive means can be mounted on an aircraft to power nose landing gear wheels, main landing gear wheels, or both nose and main landing gear wheels. For example, in U.S. Pat. No. 7,445,178 to McCoskey et al, electric motors are described mounted on nose landing gear wheels, while in U.S. Patent Application Publication No. US2012/0104159 to Charles et al, electric motors are described to be mounted on main landing gear wheels. The direction of ground travel is typically controlled in a taxiing aircraft by a steering system in the nose landing gear that turns the nose wheels in a desired travel direction. Available aircraft steering systems, however, are used on aircraft that rely on the operation of one or more of the aircraft's main engines to move the aircraft during ground travel.

Locating an electric or other drive means in one or more aircraft nose landing gear wheels does not impact operation of a nose wheel steering system. Typically, aircraft accomplish steering by swiveling a lower portion of a shock strut supporting the nose landing gear wheels. A hydraulic steering unit is usually mounted on a fixed portion of the shock strut and is linked to a swiveling portion of the nose landing gear structure to which the nose wheel or nose wheels are attached. A drive means mounted within a nose wheel does not interfere with this steering action. A nose wheel-mounted drive means can be operated in conjunction with the steering system to maneuver the aircraft effectively through a range of different kinds of turns.

A drive means mounted to drive one or more main landing gear wheels cannot presently operate to maneuver a turning aircraft as effectively, however. An aircraft with drive means mounted on two main landing gear wheels that must make a tight turn will experience one driven main wheel turning while the other driven main wheel is not turning. The main wheel drive means, by themselves, cannot determine whether the nose landing gear has turned to turn the aircraft as needed. The main wheel drive means could be spinning the aircraft on its axis and/or causing the nose wheels to skid. If the distance travelled by each of the main landing gear drive means is the same, the nose landing gear will be moving in a straight line, whether the nose wheels are straight or turned. The resulting side loads on the nose landing gear structures in a turned nose gear could cause these structures to be fatigued, to weaken, or even to be irreparably damaged. Consequently, some type of steering control for the nose landing gear is required when drive means are to be mounted to drive an aircraft's main landing gear wheels during taxi.

The self-contained taxi system described by Kelly et al in U.S. Pat. No. 3,807,664 includes a hydraulic mechanism connected to an aircraft's main wheels that controls wheel drive speed and torque to drive aircraft wheels at taxi speed and an aircraft's electro-hydraulic steering system to control nose wheel steering during taxi. Control of aircraft movement and nose wheel steering is accomplished primarily by regulating hydraulic fluid flow. An optional separate hydraulic nose wheel drive mechanism is also provided to drive the nose wheels and control nose wheel turns separately and together with the control of the main wheels by regulating pressure of hydraulic fluid, although electric control is also contemplated. The kind of control required to avoid loads on the nose gear described above is not suggested.

There is a need for a system for controlling simultaneously aircraft non-engine taxi and nose wheel steering in an aircraft with non-engine drive means mounted on main landing gear wheels to effectively drive the aircraft on the ground and maneuver the aircraft through any turns the aircraft is required to make during ground movement.

SUMMARY OF THE INVENTION

It is a primary object of the present invention, therefore, to provide a system for controlling simultaneously aircraft non-engine taxi and nose wheel steering in an aircraft with non-engine drive means mounted on main landing gear wheels to effectively drive the aircraft on the ground and maneuver the aircraft through any turns the aircraft is required to make during ground movement.

It is another object of the present invention to provide a system to control nose wheel steering in an aircraft equipped with non-engine drive means mounted on main landing gear wheels to move the aircraft autonomously during ground movement.

It is an additional object of the present invention to provide a nose wheel steering angle measurement means useful to control aircraft maneuvers and turns in an aircraft equipped for autonomous ground movement with non-engine drive means mounted on aircraft main landing gear wheels.

It is a further object to provide a system for autonomous aircraft ground movement designed to obtain the benefits provided by both main landing gear-mounted non-engine drive means and effectively controlled nose wheel steering.

It is yet another object of the present invention to provide a system for autonomous aircraft ground movement designed to take advantage of the improved ground maneuverability possible with steerable aircraft main landing gear and to achieve additional improvements in control of aircraft ground travel and direction of travel not heretofore possible when main landing gear wheels are equipped with non-engine drive means controllable to move an aircraft autonomously during taxi.

In accordance with the aforesaid objects, an electric taxi system is provided for the simultaneous control of aircraft autonomous ground movement and direction of aircraft autonomous ground movement. Independently controlled electric drive means capable of driving an aircraft landing gear wheel to move an aircraft autonomously on the ground without reliance on the aircraft's main engines are mounted to provide driving torque to at least two aircraft main landing gear wheels. The aircraft nose landing gear steering system is provided with steering control means including steering angle measurement means. The present system overcomes the steering challenges that presently accompany the use of electric drive means on main landing gear wheels to drive aircraft autonomously during taxi.

Other objects and advantages will be apparent from the following description, claims, and drawings.

BRIEF DESCRIPTION OF THE DRAWINGS

FIG. 1 is a schematic diagram showing relative positions of the nose and main landing gear wheels on an aircraft with one type of main landing gear configuration when the nose landing gear is turned 90°;

FIG. 2 is a schematic diagram of the relative positions of nose and main landing gear wheels on an aircraft with a second type of main landing gear configuration when the nose landing gear is turned 70°;

DESCRIPTION OF THE INVENTION

Figure 3:
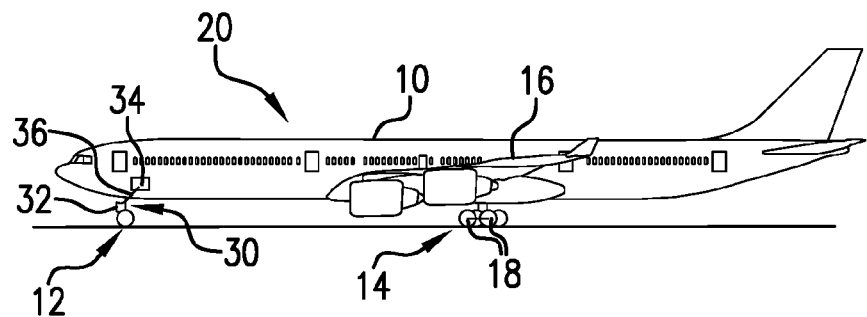
FIG. 3 is a side view of an aircraft with the system for controlling aircraft ground travel and aircraft steering of the present invention.

The substantial benefits of enabling an aircraft to move autonomously on the ground between landing and takeoff without reliance on operation of the aircraft's engines or tow vehicles have been acknowledged. As noted above, the use of drive means mounted on one or more aircraft landing gear wheels has been proposed to produce autonomous aircraft ground movement. There are presently operating advantages possible when non-engine drive means are mounted on an aircraft's nose landing gear wheels and controlled to drive the aircraft during taxi or other ground movement. For example, both ground movement and direction of ground travel operations are both associated with the nose wheels and the nose landing gear, and the control of both operations involves connected aircraft structures at essentially a single location. There are, however, advantages in aircraft ground travel that can be achieved when non-engine drive means are mounted to drive main landing gear wheels.

A main advantage that can be achieved by equipping main landing gear wheels with drive means to move aircraft autonomously on the ground is the traction that can be achieved when main wheels, rather than nose wheels, are the aircraft's drive wheels. However, the main landing gear wheels on a number of types of aircraft do not have controllable steering capability and, therefore, cannot simultaneously both drive an aircraft autonomously and steer the aircraft as required during ground travel. Other types of aircraft, including, for example, the Boeing 747 and 777 aircraft, have hydraulically actuated main landing gear steering that can be programmed to provide steering ratios proportional to the nose landing gear steering angle. To illustrate, in a Boeing 747 with such steering, the turning angle of the main landing gear may be a 70° angle.

FIG. 1 illustrates, schematically, one arrangement of relative positions of nose landing gear 12 and main landing gear 14 on an aircraft body 10 (shown partially in outline). The relative location of the aircraft wings is indicated at 16. The nose landing gear 12 has two nose wheels 11 mounted on an axle 13. In the FIG. 1 arrangement, each of the two sets of right and left main landing gears, which are located under a respective aircraft wing 16, has a bogie unit 14 with three sets of main landing gear wheels 15 mounted on axles 17. The three right and left sets of main landing gear wheels and axles are designated, respectively, aR, bR, and cR and aL, bL, and cL. A truck beam 19 connects the three sets aR, bR, and cR or aL, bL, and cL of axles 17 and wheels 15 in each main landing gear multiple axle bogie unit. The right and left sets of main landing gears are so designated to define the locations of these structures relative to a person on the aircraft who is facing the nose of the aircraft.

The centerline of the aircraft 10 is indicated by the broken line 2. The broken line 4 represents a an extension of the central axis of the nose gear wheels 11 and axle 13, and the broken lines 6 each represent an extension of the central axis of each set aR, bR, and cR and aL, bL, and cL of right and left main gear wheels 15 and axles 17. The line 4 and the lines 6 intersect at a point 8, which represents the turn center of the aircraft when the nose landing gear 12 is making a 90° turn to the left. The right and left main landing gear wheel set bR, bL does not change position and moves in a straight line relative to the centerline 2 of the aircraft. The right and left main landing gear wheel sets aR, aL have moved so that they are different distances from the wheel sets bR, bL, with the wheels 15 of left set aL, which are on the inside of the turn, a greater distance and turned at a different angle than the wheels of the right set aR. Similarly, the wheels of the left set cL are a greater distance from left set bL and are turned at a different angle than the wheels of the right set cR. If the aircraft was making a 90° turn to the right, the relative positions of the right wheel sets aR, bR, and cR would be essentially the same as those of the left wheel sets aL, bL, and cL shown in FIG. 1. The relative positions of the main landing gear wheels 15 in each bogie unit will depend on the turning angle of the nose landing gear 12 and will be different at different nose gear turning angles.

FIG. 2 illustrates a different nose gear turning angle and turning direction from that shown in FIG. 1. FIG. 2 also illustrates an aircraft with a different main landing gear and wheel configuration from that shown in FIG. 1. This main landing gear arrangement has right and left sets dR, dL of forward main landing gear bogie units that are located under the aircraft wings 16 and right and left sets eR, eL of rear main landing gear bogie units that are located under the aircraft body 10. Each forward bogie unit dR and dL and rear bogie unit eR and eL has two sets of axles 17 with wheels 15 mounted thereon and a truck beam 19 connecting the axles 17 of the two sets of wheels.

Dashed lines 5 extend from the center of the truck beam 19 instead of from the central axis of the wheels 15, as in FIG. 1, to intersect at a point 8 and to define a maximum turning angle m. The maximum turning angle for the rear main landing gear wheels in the arrangement shown in FIG.

2 is 13°. The nose landing gear 12 is shown simultaneously turned 70° to the right, which, in this case, will be the maximum turning angle n. The maximum nose landing gear turning angle n may be determined by the intersection of dashed line 4, connecting the point 8 at which dashed lines 5, indicating the centers of the truck beams 19 of the four bogie units dR, dL, eR, and eL, intersect and the aircraft body centerline 2. The forward wing set dR, dL of landing gear wheels 15 does not turn, while the rear body set eR, eL of landing gear wheels 15 turns as indicated to enable the aircraft to make a 70° turn. As discussed above and indicated in FIG. 2, the right and left rear bogie units eR, eL of the main landing gear mounted on the aircraft body in this main landing gear configuration can turn a maximum of 13°. Other maximum turning angles may be achieved with other bogie unit configurations.

Figure 4:
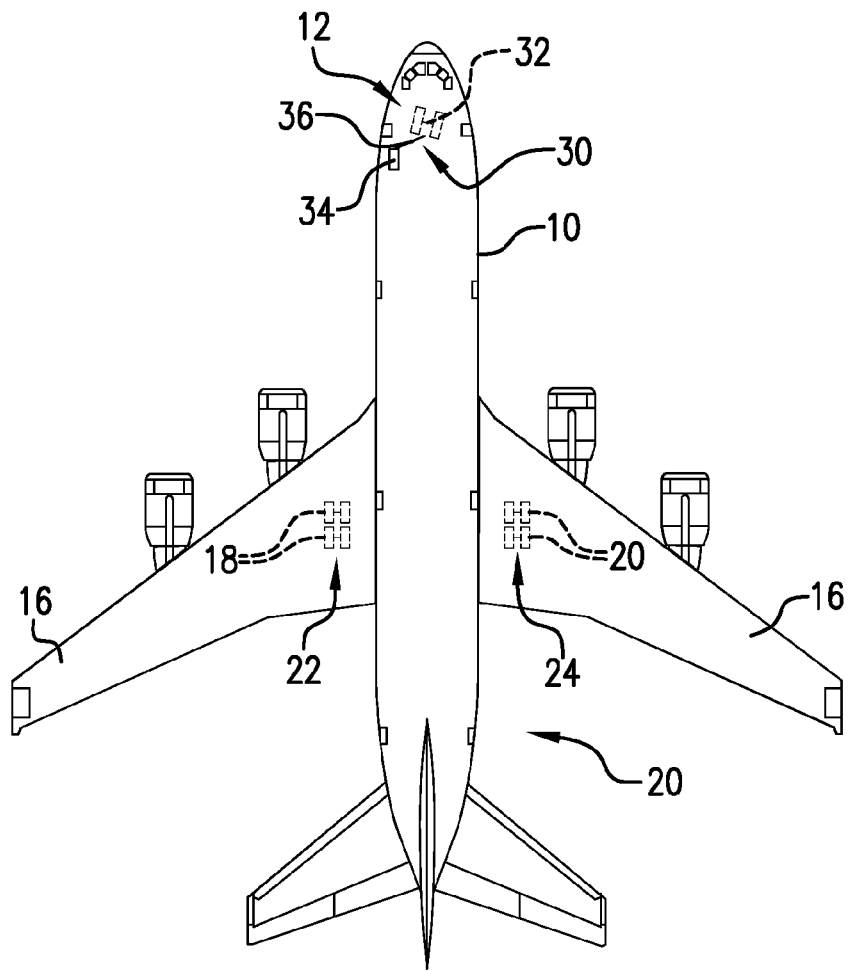
FIG. 4 is a top view of an aircraft with the system for controlling aircraft ground travel and aircraft steering of the present invention.

The system of the present invention enables an aircraft equipped with non-engine drive means on main landing gear wheels to drive an aircraft when good traction is required and to steer the aircraft, as described in connection with FIGS. 1 and 2 and below, in a desired direction of ground travel. Referring further to the drawings, FIG. 3 illustrates an aircraft 20 in side view, and FIG. 4 illustrates a top view of the aircraft 20. The aircraft 20 has two main landing gears with bogie units 22 and 24, seen more clearly in FIG. 4, with a wheel configuration similar to that of the bogie units shown in FIG. 2. One right and one left main landing gear bogie unit, each with four wheels mounted on parallel axles connected by a truck beam, is mounted on each main landing gear bogie unit 22 and 24 under each aircraft wing 16. The aircraft 20 additionally has a steerable nose landing gear 12 with two wheels.

Aircraft may be equipped with varying numbers of bogie units associated with main landing gears, some of which are typically located under the aircraft wings, as shown in FIGS. 1, 3, and 4, and others of which may be located under the aircraft main body. Other arrangements of main landing gears, such as that shown in FIG. 2, may also include bogie units located under the main body 10 of the aircraft as well as under the aircraft's wings 16. The present invention is intended for use with any type of arrangement of main landing gear bogie units in any location on an aircraft where main landing gears are located.

A preferred mounting location for a non-engine drive means in accordance with the present invention is one that enables the drive means to effectively drive a main landing gear wheel, for example outer wheels 18 and/or 20 on the main landing gear bogie units 22 and 24, shown in FIG. 4. Non-engine drive means could also be installed on inner main landing gear wheels, and this is additionally contemplated to be within the scope of the present invention. While one or more non-engine drive means may be installed on main landing gear wheels, it is preferred that at least two drive means be installed. Drive means may be installed on inner, outer, or both inner and outer main landing gear wheels. The installation of greater numbers of drive means on landing gear wheels is also contemplated to be within the scope of the present invention. A greater number of drive means may provide more efficient autonomous ground movement control in some aircraft. Whatever location and numbers of landing gear wheels are selected as optimum for non-engine drive means, the installation of such drive means on these main landing gear wheels must be done in a manner that will accommodate aircraft brake assemblies, which are located on main landing gear wheels.

A non-engine drive means preferred for controlling autonomous aircraft ground movement according to the present invention is an electric motor that may be any one of a number of designs, for example an inside-out motor attached to a wheel hub in which a rotor can be internal to or external to a stator, such as that shown and described in U.S. Patent Application Publication No. 2006/0273686, the disclosure of which is incorporated herein by reference. A toroidally-wound motor, an axial flux motor, a permanent magnet brushless motor, a synchronous motor, an asynchronous motor, a pancake motor, a switched reluctance motor, electric induction motor, or any other electric motor geometry or type known in the art is also contemplated to be suitable for use in the present invention.

The non-engine drive means selected should be able to drive an aircraft wheel at a desired speed and torque capable of moving a variety of different kinds of aircraft on a ground surface at runway speeds. One kind of electric drive means preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Other drive means designs, such as that described in commonly owned co-pending International Patent Application No. PCT/US/13/51407, filed 19 Jul. 2013, entitled Aircraft Drive Wheel System with Roller Traction Drive System, the disclosure of which is fully incorporated herein, that are capable of high torque operation across a desired speed range and can move an aircraft wheel as described herein may also be suitable for use in the present invention and are contemplated to be within the scope of the present invention.

Moving an aircraft on the ground using an electric drive means requires providing sufficient electric power to the drive means to produce a torque capable of driving an aircraft wheel to move the aircraft at a desired ground or taxi speed. The current, and the voltage and frequency of the current, applied to the motor can be controlled to regulate speed. The electric current needed to power an electric drive means or motor does not require connection to an aircraft's main electrical power system. The preferred source of electric power for connection to the electric connector of the present invention is the aircraft auxiliary power unit (APU). Other power sources could also be used to supplement or replace the APU as a source of power. These power sources can include, for example without limitation, an aircraft engine auxiliary power unit, fuel cells, any kind of solar power units, POWER CHIPS™, batteries, and burn boxes, as well as any other suitable power source effective for this purpose. Control of the flow of current to the drive means, as well as the voltage and frequency of the current, allows the torque generated by the drive means to be controlled and, consequently, the speed of the wheel powered by the drive means and the ground travel speed of the aircraft to be controlled. This type of control can be achieved with any of the aforementioned power sources. Depending on the specific power source used, modification of the control of current flow to the drive means to generate the desired torque may be required.

The non-engine drive means selected to power an aircraft's main wheels, while preferably electric as described above, could be any other kind of drive means, including, for example hydraulic and pneumatic drive means, controllable to drive the aircraft's wheels to move the aircraft independently of the operation of the aircraft's main engines or tow vehicles.

Any of the drive means described or referred to above may be installed on main landing gear wheels to produce main landing gear drive wheels controllable to drive an aircraft autonomously during taxi. When an aircraft equipped with non-engine drive means on one or more main landing gear wheels does not have the type of main landing gear steering capability discussed in connection with FIGS. 1 and 2, turning the aircraft in a desired direction may present challenges. For example, the nose landing gear 12 may be turned to the right, as in FIGS. 2 and 4, so that the aircraft will be driven to the right. However, if the main landing gear drive wheels are driving the aircraft in a straight line, which they are designed to do in this situation, the aircraft will be driven in a straight direction, even though the nose wheels are turned, which may have adverse consequences for nose landing gear structures.

Additional steering control must be provided to enable main landing gear drive wheels without the aforementioned steering capability to drive an aircraft while controlling the aircraft's direction of ground travel to avoid damage to the nose landing gear. A pilot should be capable of effectively controlling a nose wheel steering system and ground travel of an aircraft when non-engine drive means are used to drive nose wheels. However, unless there is communication between a non-engine drive system and/or non-engine drive means driving an aircraft's main wheels and the aircraft's nose landing gear steering system, either ground travel or direction of ground travel can be selectively controlled. Both cannot be controlled simultaneously at the present time. The present invention overcomes this challenge and provides an effective way to steer an aircraft while it is driven on the ground by main landing gear drive wheels, whether in an aircraft with controllable main landing gear wheel steering or in an aircraft that does not have controllable main landing gear wheel steering.

For an aircraft to be simultaneously driven by non-engine main landing gear wheel drive means and steered in a required direction during ground travel, the nose wheel steering angle must be known. Whether an aircraft's steering system provides the nose wheel steering angle or any information relating to steering depends on the type of aircraft. For example, the steering system of an Airbus A320 aircraft provides information relating to steering and steering angle, while the steering system of a Boeing 737NG does not. The position of the nose landing gear wheels in an A320 aircraft is measured by a transducer, which may be a linear or rotary variable differential transducer. Information relating to nose wheel position is sent to a brake and steering control unit and is compared to tiller or rudder input to produce a nose wheel steering angle. In a Boeing 737NG, a hydraulic system is used in combination with both rudder pedals and a tiller wheel to turn the nose wheels to either side over a range of from zero degrees to about 78°.

The present invention provides a nose gear steering angle detection and measurement means 30 (FIGS. 3 and 4) that is integrated with the nose wheel steering system in an aircraft nose landing gear on an aircraft in which one or more main landing gear wheels are drive wheels equipped with non-engine drive means for autonomous ground movement as described above. The steering angle detection and measurement means includes at least a steering angle sensor 32 electronically connected to a processor 34, such as by a connection 36, to determine steering angle in connection with a control system (not shown) for the main landing gear wheel drive means. The processor 34 and connection 36 are shown schematically and may be located in any convenient location on an aircraft that enables communication between a nose landing gear steering system and main landing gear drive wheels driven by non-engine drive means. Steering angle sensors for aircraft and other vehicles are known and can be adapted as required to detect and provide aircraft nose wheel steering angle to a processor while non-engine drive means powering aircraft main wheels are operating to move the aircraft during taxi or other ground travel.

Integrating steering angle information with the traction benefits of powered main drive wheels makes it possible to drive aircraft autonomously and independent of the aircraft main engines as well as to turn an aircraft and drive it in the directions required during ground travel between landing and takeoff. Operation of a main landing gear drive wheel non-engine drive means can be controlled simultaneously in conjunction with nose landing gear steering control to enable an aircraft to make any tight turns and other maneuvers required, including those necessary to park the aircraft at a gate or to push the aircraft back and then turn to taxi to a takeoff runway.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary application where it is desired to take advantage of the traction benefits accompanying equipping aircraft main landing gear wheels with non-engine drive means for autonomous ground movement while simultaneously enabling greater control of direction of ground travel using nose landing gear steering, alone or in combination with main landing gear wheel steering, when the aircraft is driven autonomously on a ground surface by the non-engine drive means on main landing gear wheels.

The invention claimed is:

1. A system for simultaneously controlling autonomous ground movement and direction of ground travel of an aircraft with landing gear wheels equipped with non-engine drive means, comprising:

a. one or more pairs of main landing gears connected to an aircraft at selected locations on opposite sides of a central axis of an aircraft, each said one or more pairs of main landing gears comprising at least one bogie unit with a plurality of paired main wheels connected by a truck beam, wherein one or more of said main wheels on said at least one bogie unit comprise drive wheels equipped with a non-engine drive means comprising an electric motor controllable to drive said one or more main wheels to move said aircraft autonomously during taxi on a ground surface;

b. a nose landing gear comprising at least a pair of nose wheels and a nose wheel steering system controllable to move said aircraft in a required ground travel direction;

c. a nose landing gear steering angle detection and measurement means for determining data from a turning angle of said nose landing gear comprising at least a steering angle sensor; and d. a processor in electronic communication with said nose landing gear steering angle detection and measurement means adapted to receive and process said turning angle data, wherein said processor is in communication with said non-engine drive means to simultaneously control aircraft autonomous ground travel and ground travel direction in response to said turning angle data.

2. The system of claim 1, wherein said one or more pairs of main landing gears further comprises a controllable steering system operable to change travel direction of selected ones of said plurality of main wheels as required by said turning angle data.

3. The system of claim 1, wherein at least two of said one or more main wheels comprise said drive wheels and are equipped with electric motors.

4. The system of claim 3, wherein said at least two main wheels equipped with electric motors comprise outboard wheels, inboard wheels, or both outboard and inboard wheels on each of a pair of bogie units on opposite sides of said aircraft.

5. The system of claim 3, wherein said electric motors are powered by an aircraft auxiliary power unit to drive said aircraft main landing gear drive wheels and move said aircraft on the ground.

6. The system of claim 1, wherein said steering angle sensor is mounted on said nose landing gear to detect and measure a steering angle of an aircraft nose landing gear wheel.

7. A method for simultaneously controlling aircraft ground movement and direction of aircraft ground travel autonomously without operation of aircraft main engines in aircraft with nose and main landing gears, comprising:
   a. mounting electric drive motors controllable to move an aircraft autonomously during taxi on at least two main landing gear wheels on opposite sides of a central axis of said aircraft;
   b. integrating a steering angle detection and measurement means for obtaining information relating to the steering angle of nose landing gear wheels into a nose landing gear wheel steering system of said aircraft and determining a nose landing gear wheel steering angle;
   c. providing a processor in communication with said steering angle detection and measurement means and in communication with said electric motors; and
   d. during operation of said electric drive motors to move said at least two main landing gear wheels and said aircraft autonomously during taxi, detecting information relating to the determined nose wheel turning angle with said steering angle detection and measurement means, communicating the determined nose wheel steering angle to the processor; and integrating the nose wheel steering angle with control of said electric drive motors to simultaneously control autonomous ground movement and direction of ground travel of said aircraft.

8. The method of claim 7, further comprising, when said aircraft is equipped with at least two or more sets of main landing gears, each with two or more sets of paired steerable wheels comprising forward wheels and rear wheels positioned on opposite sides of said central axis, defining a maximum turning angle for the rear wheels located in at least two of said two or more sets of main landing gears, and determining a maximum turning angle for the nose landing gear wheel from the defined maximum angle for the rear main landing wheels.

9. The method of claim 7, further comprising providing a steering angle detection and measurement means on said aircraft nose landing gear comprising a nose gear steering angle sensor.

10. The method of claim 9, further comprising controlling aircraft taxi and direction of taxi by obtaining an aircraft nose landing gear steering angle from the steering angle sensor and providing the nose landing gear steering angle to said electric drive motors to control the direction of taxi in response to the steering angle while said aircraft is driven during taxi by the electric drive motors.

* * * * *